United States Patent
Shintani et al.

(10) Patent No.: US 10,567,675 B2
(45) Date of Patent: Feb. 18, 2020

(54) IMAGING APPARATUS AND IMAGING METHOD FOR MAINTAINING CONTINUITY BETWEEN FRAMES OF MOVING IMAGE DATA

(71) Applicant: Olympus Corporation, Hachioji-shi, Tokyo (JP)

(72) Inventors: Koichi Shintani, Hachioji (JP); Masaomi Tomizawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 35 days.

(21) Appl. No.: 15/698,599

(22) Filed: Sep. 7, 2017

(65) Prior Publication Data

US 2018/0077358 A1 Mar. 15, 2018

(30) Foreign Application Priority Data

Sep. 9, 2016 (JP) .................. 2016-176758

(51) Int. Cl.
*H04N 5/265* (2006.01)
*G06T 5/00* (2006.01)
*H04N 5/91* (2006.01)
*H04N 5/232* (2006.01)

(52) U.S. Cl.
CPC ............ *H04N 5/265* (2013.01); *G06T 5/002* (2013.01); *H04N 5/23293* (2013.01); *H04N 5/91* (2013.01)

(58) Field of Classification Search
CPC ............... H04N 5/265; H04N 5/23245; H04N 5/23293; H04N 5/2356; H04N 5/2622; H04N 5/772; H04N 5/91; H04N 9/8047; H04N 5/355; H04N 5/35536; H04N 5/35545; H04N 5/35554; H04N 5/35581; G06T 5/002; G11B 27/30
See application file for complete search history.

(56) References Cited

U.S. PATENT DOCUMENTS

| | | | |
|---|---|---|---|
| 7,548,689 B2 * | 6/2009 | Yap .................. | G03B 7/08 348/208.13 |
| 9,131,201 B1 * | 9/2015 | Geiss ............... | H04N 5/235 |
| 2008/0253758 A1 * | 10/2008 | Yap .................. | G03B 7/08 396/234 |

(Continued)

FOREIGN PATENT DOCUMENTS

| CN | 105531990 A | 4/2016 |
|---|---|---|
| JP | 2015056807 A | 3/2015 |

OTHER PUBLICATIONS

First Office Action to corresponding Chinese Patent Application No. 201710799335.8, dated Oct. 10, 2019 (7 pgs.), with translation (14 pgs.).

*Primary Examiner* — Nicholas G Giles
(74) *Attorney, Agent, or Firm* — John C. Pokotylo; Pokotylo Patent Services

(57) ABSTRACT

An imaging apparatus includes an imaging unit, a first image processor, and a second image processor. The imaging unit sequentially acquires image frames whose photography conditions have been changed. The first image processor generates moving image data by performing image processing to maintain continuity between the image frames obtained by changing the photography conditions. The second image processor composes the image frames whose photography conditions have been changed, to generate condition-changed still image data.

8 Claims, 15 Drawing Sheets

(56) References Cited

U.S. PATENT DOCUMENTS

2014/0205193 A1\* 7/2014 Umezu ................ H04N 5/2355
            382/169
2016/0227092 A1\* 8/2016 Ikeda ..................... H04N 5/772
2017/0163913 A1\* 6/2017 Shigeta ............. H01L 27/14612
2017/0339325 A1\* 11/2017 Dabral ................... H04N 5/217

\* cited by examiner

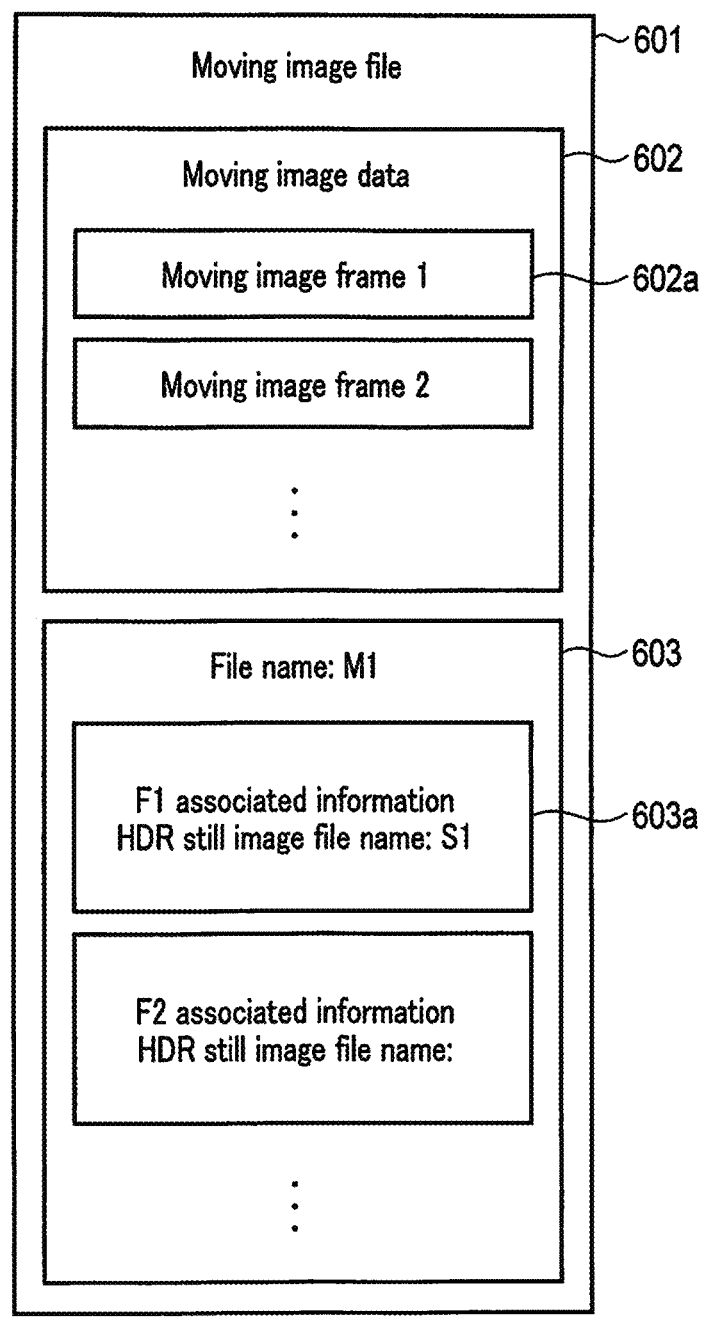
F I G. 8A

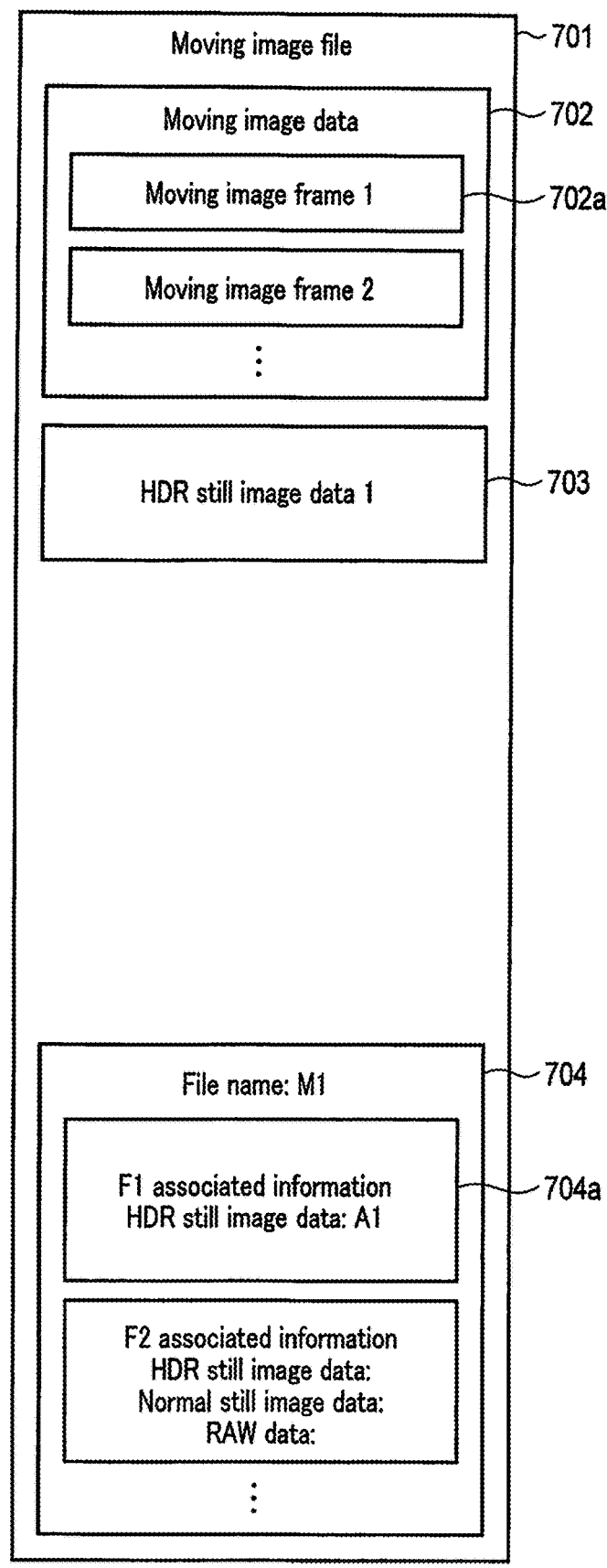
F I G. 9

IMAGING APPARATUS AND IMAGING METHOD FOR MAINTAINING CONTINUITY BETWEEN FRAMES OF MOVING IMAGE DATA

CROSS-REFERENCE TO RELATED APPLICATIONS

This application is based upon and claims the benefit of priority from the prior Japanese Patent Application No. 2016-176758, filed Sep. 9, 2016, the entire contents of which are incorporated herein by reference.

BACKGROUND OF THE INVENTION

1. Field of Invention

The present invention relates to an imaging apparatus and an imaging method.

2. Description of Related Art

Recent imaging apparatuses are each connectable to a television by wired communication or wireless communication. Thus, a user can watch images acquired by the imaging apparatus in a large screen of the television. Imaging apparatuses can be apparatuses which can provide attractive contents to televisions.

For example, an imaging apparatus suggested in Jpn. Pat. Appln. KOKAI Publication No. 2015-56807 composes images having different exposure conditions obtained during the recording of an HDR moving image when there is given an instruction of a still image photography during the recording of the HDR moving image, thereby recording an HDR still image.

BRIEF SUMMARY OF THE INVENTION

According to a first aspect of the invention, there is provided an imaging apparatus comprising: an imaging unit which sequentially acquires image frames whose photography conditions have been changed; a first image processor which generates moving image data by performing image processing to maintain continuity between the image frames obtained by changing the photography conditions; and a second image processor which composes the image frames whose photography conditions have been changed, to generate condition-changed still image data.

According to a second aspect of the invention, there is provided an imaging apparatus comprising: an imaging unit which sequentially acquires image data groups comprising pieces of image data different in photography conditions; a first image processor which generates moving image data comprising moving image frames formed by each of the pieces of the image data; and a second image processor which composes pieces of image data belonging to each of the image data groups or pieces of image data that do not belong to the image data groups, to generate condition-changed still image data.

According to a third aspect of the invention, there is provided an imaging method comprising: sequentially acquiring, by an imaging unit, image frames whose photography conditions have been changed; generating moving image data by performing image processing to maintain continuity between the image frames obtained by changing the photography conditions; and composing the image frames whose photography conditions have been changed, to generate condition-changed still image data.

According to a fourth aspect of the invention, there is provided an imaging method comprising: sequentially acquiring, by an imaging unit, image data groups comprising pieces of image data different in photography conditions; generating moving image data comprising moving image frames formed by each of the pieces of the image data; and composing image data belonging to each of the image data groups or image data that do not belong to the image data groups, to generate condition-changed still image data.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 8A is a diagram showing the structure of a moving image file;

FIG. 9 is a diagram showing the structure of a moving image file in the case where moving image data and still image data are recorded in one file;

DETAILED DESCRIPTION OF THE INVENTION

Figure 1:
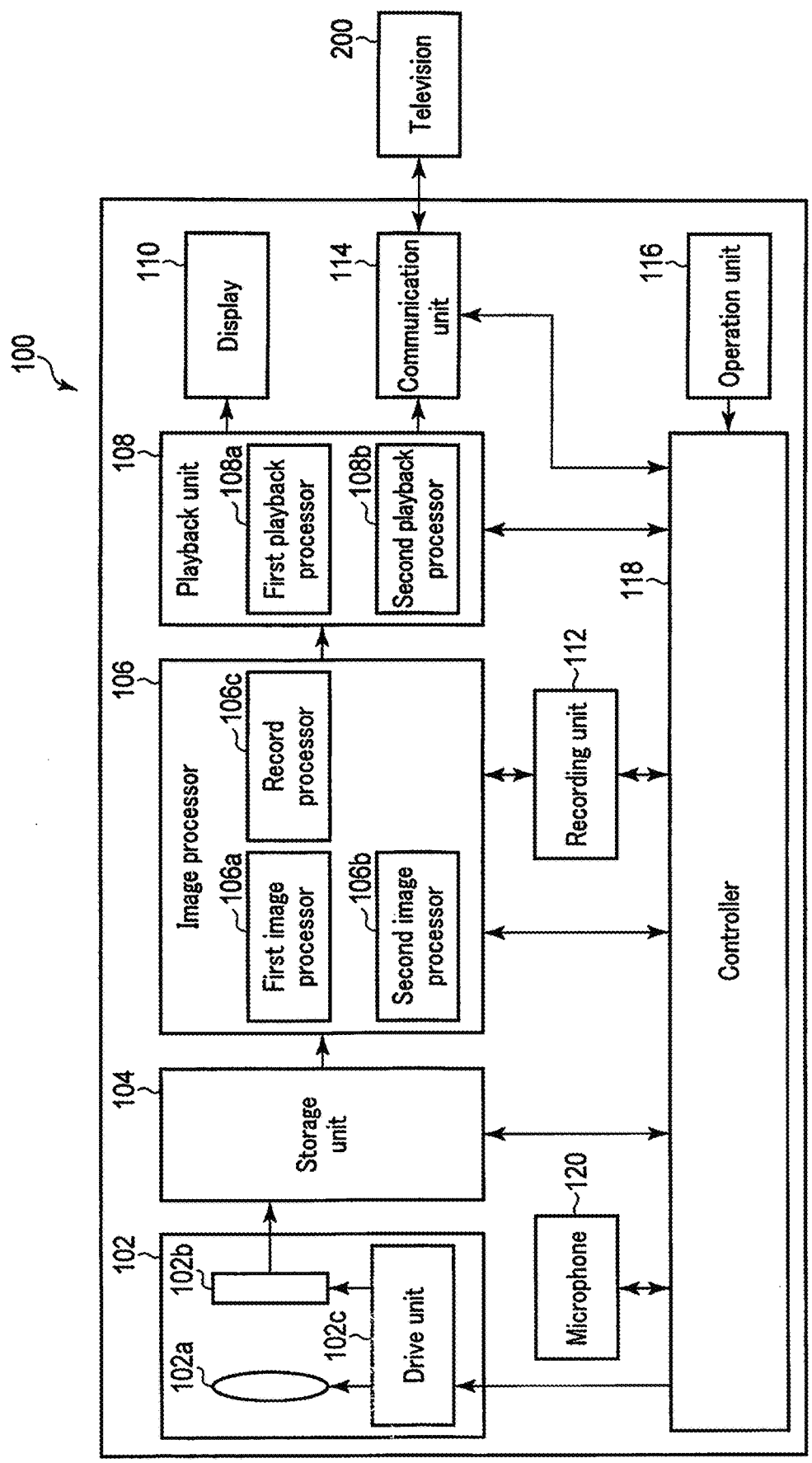
FIG. 1 is a block diagram showing the configuration of one example of an imaging apparatus according to one embodiment of the present invention.

Hereinafter, an embodiment of the present invention will be described with reference to the drawings. FIG. 1 is a block diagram showing the configuration of one example of an imaging apparatus according to one embodiment of the present invention. An imaging apparatus 100 shown in FIG. 1 includes various devices having imaging functions, such as a digital camera, a smartphone, and a mobile telephone having a camera function. The imaging apparatus 100 shown in FIG. 1 has an imaging unit 102, a storage unit 104, an image processor 106, a playback unit 108, a display 110, a recording unit 112, a communication unit 114, an operation unit 116, a controller 118, and a microphone 120. Here, each block of the imaging apparatus 100 is formed by, for example, a combination of a hardware and a software. Each block of the imaging apparatus 100 does not need to be formed by a single hardware or software, and may be formed by hardwares and softwares.

The imaging unit 102 includes an imaging optical system 102a, an imaging element 102b, and a drive unit 102c. The imaging optical system 102a includes an aperture, lenses, and others, and allows a light flux from an unshown subject to enter the imaging element 102b. The imaging optical system 102a also includes a focus lens to adjust a focus state. The imaging element 102b includes, for example, a CMOS image sensor or a CCD image sensor, and images a target and acquires image data (RAW data) regarding the target. The imaging element 102b may include phase difference detection pixels so that the distance to the photography target can be detected. The imaging element 102b according to the present embodiment may be configured to be movable in a plane orthogonal to an optical axis of the imaging optical system 102a. The drive unit 102c drives the focus lens of the imaging optical system 102a in its optical axis direction, or drives the imaging element 102b, under the control of the controller 118.

The storage unit 104 is, for example, a DRAM, and transitorily stores image data acquired by the imaging unit 102.

The image processor 106 subjects, to image processing, the image data acquired by the imaging unit 102 and then stored in the storage unit 104. The image processor 106 includes a first image processor 106a, a second image processor 106b, and a record processor 106c.

The first image processor 106a subjects the image data stored in the storage unit 104 to image processing regarding the generation of moving image data. Although described later, image data different in photography conditions are generated during moving image photography in the present embodiment. The first image processor 106a performs processing to maintain continuity between moving image frames before generating moving image data from the image data different in photography conditions. This processing to maintain continuity includes gain adjustment processing, blurring processing, contrast enhancement processing, and others.

The second image processor 106b subjects the image data stored in the storage unit 104 to image processing regarding the generation of still image data. Here, the still image data according to the present embodiment includes normal still image data and condition-changed still image data. The normal still image data is still image data generated from one piece of image data acquired by the imaging unit 102. The condition-changed still image data is still image data formed by the composition of the pieces of image data different in photography conditions acquired by the imaging unit 102. The condition-changed still image data includes, for example, HDR still image data, super-resolution still image data, depth-composed still image data, and panning effect still image data.

The record processor 106c performs processing to generate an image file for recording from the image data generated by the first image processor 106a or the second image processor 106b. For example, the record processor 106c compresses the moving image data in a predetermined moving image compression scheme such as an H.264 scheme, and provides predetermined tag information to the compressed moving image data, to generate a moving image file. Alternatively, for example, the record processor 106c compresses the still image data in a predetermined still image compression scheme such as a JPEG scheme, and provides predetermined tag information to the compressed still image data, to generate a still image file. Here, the record processor 106c performs processing to associate the still image file with the moving image file when the still image file is generated during moving image photography. For example, the record processor 106c records, as tag information, information (e.g. the file name of an associated file) to associate the still image file with the moving image file.

The playback unit 108 performs processing to play back the image data generated by the image processor 106. The playback unit 108 has a first playback processor 108a, and a second playback processor 108b.

The first playback processor 108a performs processing to play back the moving image data in the display 110 or the television 200. For example, the first playback processor 108a inputs the moving image data generated in the first image processor 106a to the display 110 so that images will be displayed in the display 110. The first playback processor 108a sends the moving image data generated in the first image processor 106a to the television 200 via the communication unit 114 so that images will be displayed in the television 200. When the image data is compressed, the first playback processor 108a also decompresses the compressed image data. This image processing affects smoothness of moving images and is therefore preferably high-speed processing. Instantaneousness is also important in through-images or the like. In the case of moving images, smoothness of a change is required, so that even control with delayed response or the like is also suitably performed in consideration of continuity of preceding and subsequent frames.

The second playback processor 108b performs processing to play back the still image data in the display 110 or the television 200. For example, the second playback processor 108b inputs the still image data generated in the second image processor 106b to the display 110 so that images will be displayed in the display 110. The second playback processor 108b sends the still image data generated in the second image processor 106b to the television 200 via the communication unit 114 so that images will be displayed in the television 200. When the image data is compressed, the second playback processor 108b also decompresses the compressed image data. In the case of a still image, evaluation is made with the relevant image alone independently of preceding and subsequent frames, so that such an expression as in an image in the process of a scene response of moving images is not preferable. That is, even if an image is an underexposure image in the stream in moving images, a still image obtained by this timing needs to have correct exposure. However, because this image processing is only applied to limited frames, temporal restriction and instantaneousness are relatively not required, and the appropriateness, decency, and the like of the expression of an image to be obtained are more important than time. Moreover, a still image is also required to adapt to printing and the like, in which case processing to adapt to the input specifications and standard of a printer may be additionally involved. To this end, image data for printing may be separately provided.

The display 110 is, for example, a liquid crystal display or an organic EL display, and displays various images such as images based on the image data input from the playback unit 108.

The recording unit 112 comprises, for example, a flash ROM. Image files generated in the record processor 106c of the image processor 106 are recorded in the recording unit 112. Various programs used to control the imaging apparatus 100 may also be recorded in the recording unit 112.

The communication unit 114 performs processing to mediate a communication between the imaging apparatus 100 and the television 200 which is an external display device. The communication unit 114 mediates the communication between the imaging apparatus 100 and the television 200, for example, by HDMI. The communication unit 114 may mediate the communication between the imaging apparatus 100 and the television 200 by wireless communication such as WiFi. The communication unit 114 may also be configured to be able to communicate with devices other than the external display device.

The operation unit 116 is an operational component for a user to operate the imaging apparatus 100. The operation unit 116 includes, for example, a release button, a moving image button, a setting button, a selection key, an electric power button, a touch panel, and others. The release button is an operational component to issue an instruction for still image photography. The moving image button is an operational component to instruct to start or end moving image photography. The setting button is an operational component to display a setting screen for the imaging apparatus 100. The selection key is an operational component to select and decide an item on, for example, the setting screen. The electric power button is an operational component to turn on or off the electric power of the imaging apparatus 100. The touch panel is provided integrally with a display screen of the display 110, and detects a user's touch operation on the display screen. The touch panel may be capable of operations equivalent to those of the release button, the moving image button, the setting button, the selection key, and the electric power button described above. Moreover, the operation unit 116 may also have other operational components in addition to the operational components described above.

The controller 118 is a control circuit such as a CPU and an ASIC, and has overall control of the operation of the imaging apparatus 100. Functions equivalent to those of the controller 118 may be enabled by a software, or may be enabled by a combination of a hardware and a software. Some of the functions of the controller 118 may be provided separately from the controller 118.

The microphone 120 acquires input sound after converting the sound into an electric signal.

The television 200 which is an external display device displays, for example, television videos. The television 200 also displays images on the basis of the image data transferred from the communication unit 114.

Figure 2A:
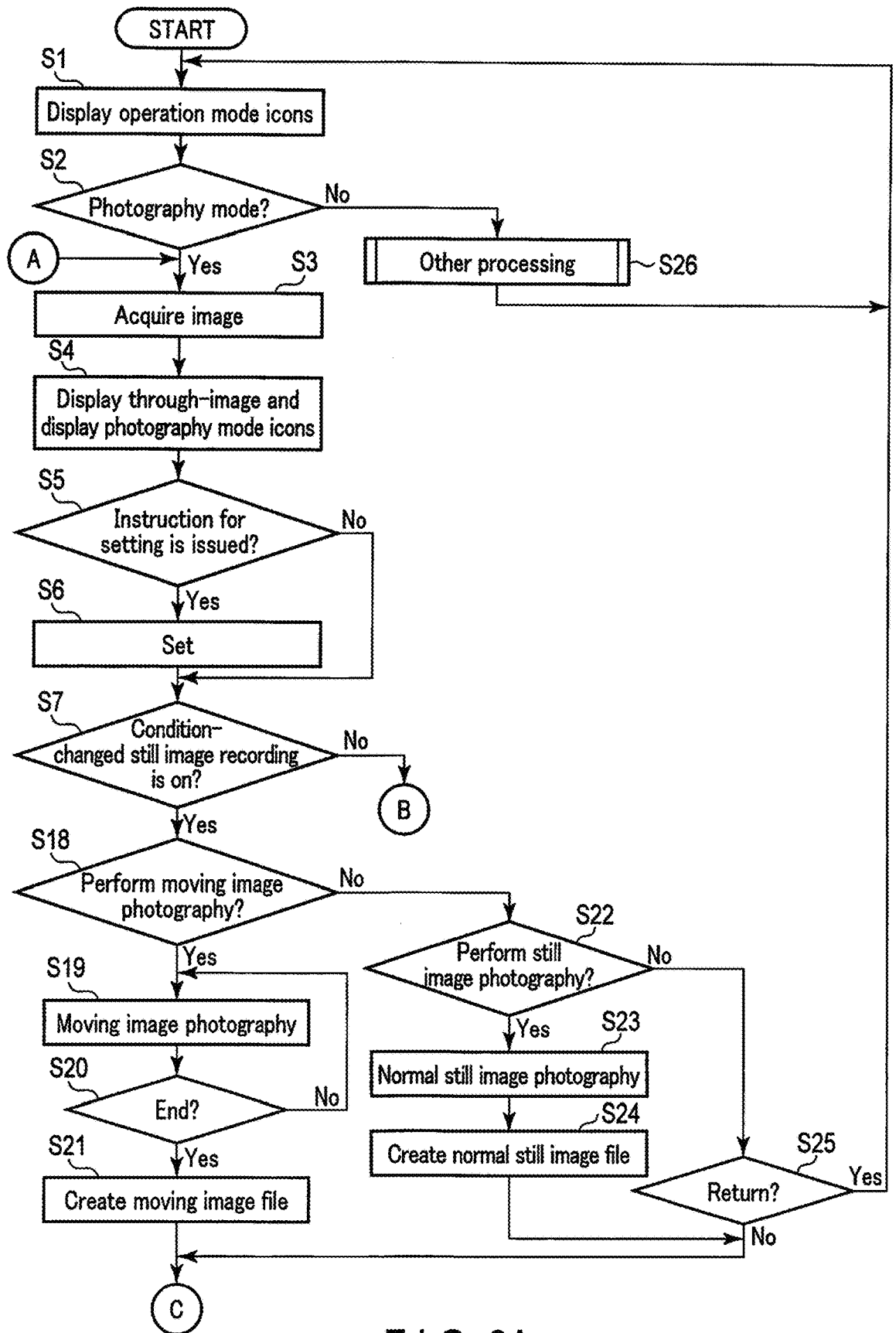
FIG. 2A is a flowchart showing the main processing of the imaging apparatus according to one embodiment of the present invention.
Figure 2B:
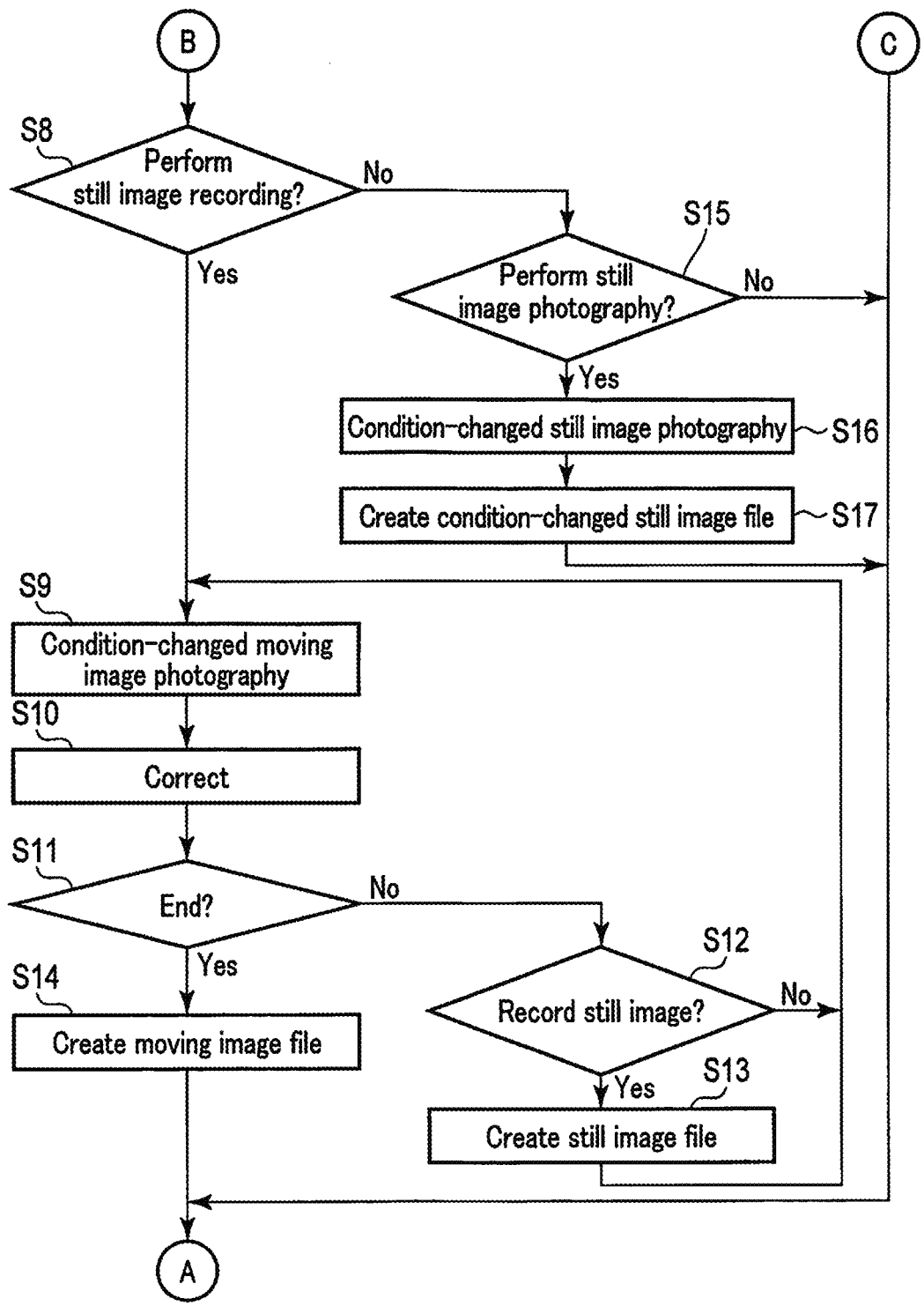
FIG. 2B is a flowchart showing the main processing of the imaging apparatus according to one embodiment of the present invention.

Now, the operation of the imaging apparatus according to the present embodiment is described. FIG. 2A and FIG. 2B are flowcharts showing the main processing of the imaging apparatus according to the present embodiment. The processing in FIG. 2A and FIG. 2B is performed mainly by the controller 118.

Figure 3A:
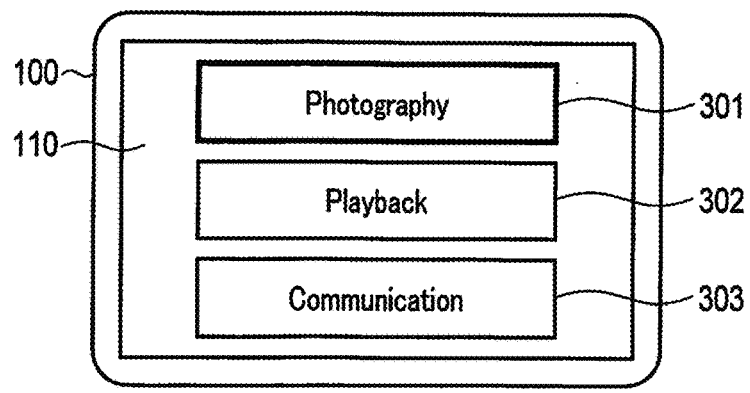
FIG. 3A is a diagram showing a display example of operation mode icons.

The processing in FIG. 2A and FIG. 2B is started when the electric power supply is turned on. In step S1, the controller 118 instructs the playback unit 108 to display operation mode icons on the display 110 for the user to select an operation mode of the imaging apparatus 100. In response to this instruction, the playback unit 108 displays, for example, a photography icon 301, a playback icon 302, and a communication icon 303 shown in FIG. 3A. The photography icon 301 is an icon for the user to instruct to switch the operation mode of the imaging apparatus 100 to a photography mode. The playback icon 302 is an icon for the user to instruct to switch the operation mode of the imaging apparatus 100 to a playback mode. The communication icon 303 is an icon for the user to instruct to switch the operation mode of the imaging apparatus 100 to a communication mode. Icons corresponding to operation modes other than the photography icon 301, the playback icon 302, and the communication icon 303 may be displayed. Otherwise, the icon display shown in FIG. 3A may not be performed. In this case, for example, when the electric power supply is turned on, the imaging apparatus 100 may enter an operation mode immediately before the electric power supply off, or enter a predetermined operation mode among the photography mode, the playback mode, and the communication mode.

In step S2, the controller 118 judges whether or not the current operation mode is the photography mode. That is, the controller 118 judges whether or not the current operation mode is the photography mode, by judging which icon is selected by the user. When it is judged in step S2 that the operation mode of the imaging apparatus 100 is the photography mode, the processing proceeds to step S3. When it is judged in step S2 that the operation mode of the imaging apparatus 100 is not the photography mode, the processing proceeds to step S26.

Figure 3B:
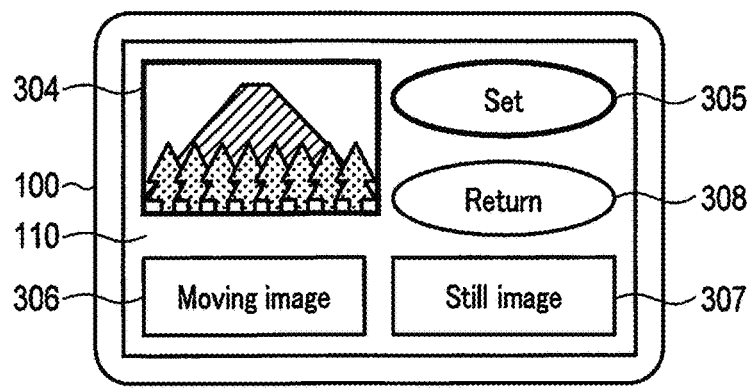
FIG. 3B is a diagram showing a display example of through-image display and photography mode icons.

In step S3, the controller 118 causes the imaging unit 102 to perform imaging to acquire image data for through-image display. In step S4, the controller 118 performs the through-image display. As the through-image display, the controller 118 causes the image processor 106 to perform signal processing. Accordingly, the image processor 106 subjects the image data acquired in the imaging unit 102 and then stored in the storage unit 104 to the image processing (the white balance correction, the gradation conversion, the color correction, and others) necessary for the through-image display to generate through-image data. After the generation of the through-image data, the playback unit 108 sequentially displays through-images 304 based on the generated through-image data on the display 110 as shown in FIG. 3B. The playback unit 108 also displays, for example, a setting icon 305, a moving image photography icon 306, a still image photography icon 307, and a return icon 308 shown in FIG. 3B in, for example, a display region different from a display region of the through-images 304. The setting icon 305 is an icon for the user to issue a setting instruction. The moving image photography icon 306 is an icon for the user to instruct to start or end moving image photography. The still image photography icon 307 is an icon for the user to issue an instruction for still image photography. The return icon 308 is an icon for the user to instruct to end the photography mode. These icons for the photography modes may be displayed over the through-images 304. Icons other than the setting icon 305, the moving image photography icon 306, the still image photography icon 307, and the return icon 308 may be displayed as icons for the photography modes.

In step S5, the controller 118 judges whether or not the user has instructed to set the imaging apparatus 100. For example, when the user has selected the setting icon 305 or operated the setting button, it is judged that a setting instruction has been issued. When it is judged in step S5 that the setting instruction has been issued, the processing proceeds to step S6. When it is judged in step S5 that the setting instruction has not been issued, the processing proceeds to step S7.

Figure 3C:
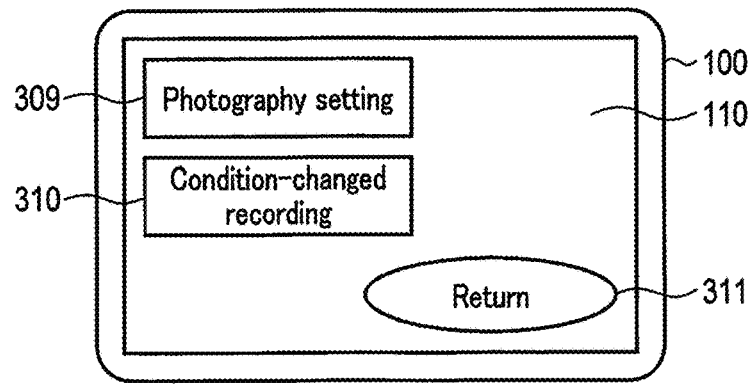
FIG. 3C is a diagram showing a display example of a setting screen.

In step S6, the controller 118 instructs the playback unit 108 to display the setting screen. In response to this instruction, the playback unit 108 displays, for example, the setting screen shown in FIG. 3C on the display 110. After the display of the setting screen, the controller 118 changes various settings in accordance with the user's operation on the setting screen. After the end of the setting on the setting screen, the processing proceeds to step S7. In the example of FIG. 3C, a photography setting icon 309, a condition-changed recording icon 310, and a return icon 311 are displayed on the setting screen. The photography setting icon 309 is an icon for the user to perform various settings at the time of photography. By selecting the photography setting icon 309, the user can set exposure conditions at the time of photography (set a shutter speed and an aperture), set recorded image quality at the time of photography, and others. The condition-changed recording icon 310 is an icon for the user to perform various settings regarding a condition-changed recording mode. By selecting the condition-changed recording icon 310, the user can set the on/off of the condition-changed recording mode, set the recording timing for the condition-changed still image during moving image photography, and make an effect check to perform setting regarding the composition processing of the condition-changed still image. The return icon 311 is an icon for the user to instruct to end the display of the setting screen.

Figure 4:
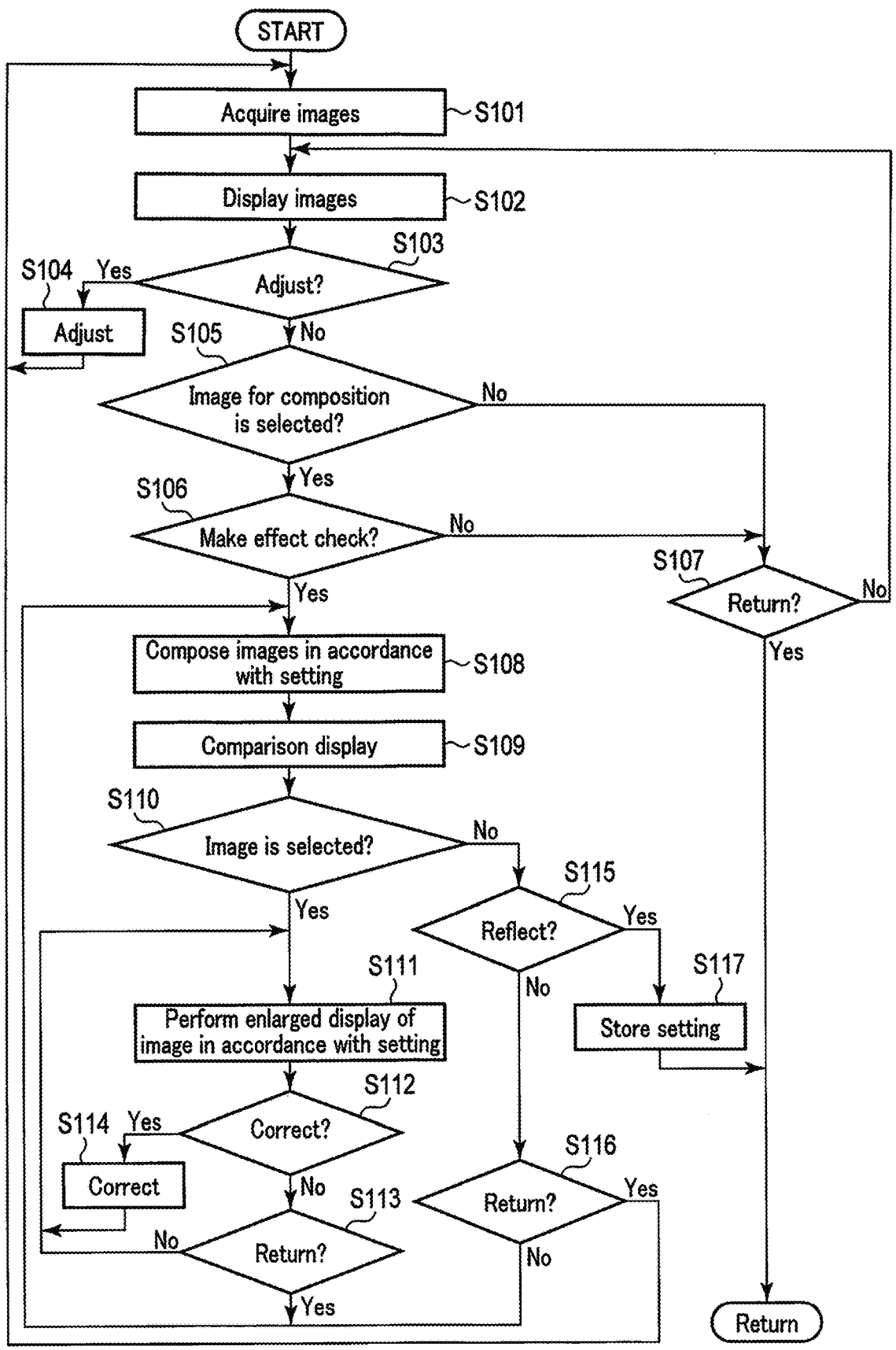
FIG. 4 is a flowchart showing processing of an effect check.

The effect check is described below. FIG. 4 is a flowchart showing processing of the effect check. In the effect check, the user can perform various settings regarding the condition-changed still image data generated during the moving image photography while actually checking the condition-changed still image.

In step S101, the controller 118 acquires image data for the effect check. In the effect check in the photography mode, the controller 118 controls the imaging unit 102 so that an image data group comprising pieces of image data different in exposure conditions will be acquired. For example, when an effect check of an HDR still image as a condition-changed still image is made, the controller 118 controls the imaging unit 102 so that an image data group comprising pieces of image data different in exposure amount will be acquired. For example, when an effect check of a super-resolution still image as a condition-changed still image is made, the controller 118 controls the imaging unit 102 so that an image data group comprising pieces of image data different in the shift direction of the imaging element 102b will be acquired. Further, when an effect check of a depth-composed still image as a condition-changed still image is made, the controller 118 controls the imaging unit 102 so that an image data group comprising pieces of image data different in focus lens position will be acquired. Moreover, when an effect check of a panning effect still image as a condition-changed still image is made, the controller 118 controls the imaging unit 102 so that an image data group comprising pieces of image data different in imaging timing will be acquired. In the processing in step S101 immediately after the execution of the processing of the effect check, the number of times of imaging and the change amount of conditions are fixed values.

Figure 5A:
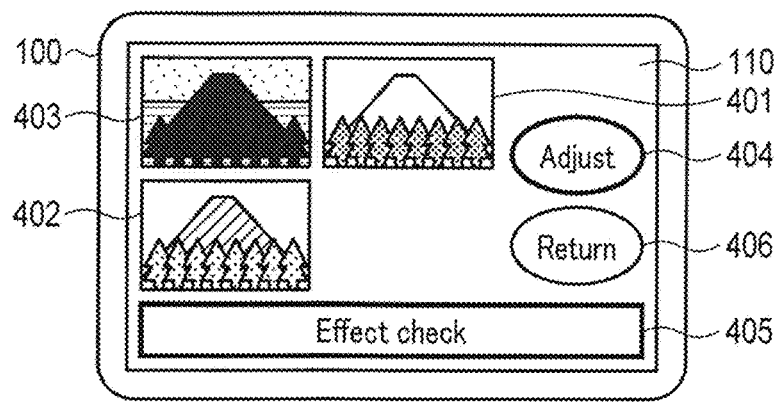
FIG. 5A is a diagram showing an example of display of a list of image data.

In step S102, the controller 118 controls the playback unit 108 to display a list of the acquired image data on the display 110. In response to this instruction, the playback unit 108 displays reduced images 401, 402, and 403 of the image data on the display 110, for example, as shown in FIG. 5A. Then the processing proceeds to step S103. The example in FIG. 5A is a display example in the case where an HDR effect check is made. Here, the reduced image 401 is a reduced image of the image data obtained by the imaging under the condition of the normal exposure, the reduced image 402 is a reduced image of the image data obtained by the imaging under the condition of the overexposure, and the reduced image 403 is a reduced image of the image data obtained by the imaging under the condition of the underexposure. Further, the playback unit 108 displays, for example, an adjustment icon 404, an effect check icon 405, and a return icon 406. The adjustment icon 404 is an icon for the user to adjust composition processing. The effect check icon 405 is an icon for the user to check the result of the composition processing. The return icon 406 is an icon for the user to instruct to end the effect check processing.

In step S103, the controller 118 judges whether or not to make an adjustment. For example, it is judged that an adjustment will be made when the user has selected the adjustment icon 404. When it is judged in step S103 that an adjustment will be made, the processing proceeds to step S104. When it is judged in step S103 that an adjustment will not be made, the processing proceeds to step S105.

In step S104, the controller 118 makes an adjustment regarding the composition processing in the effect check in accordance with the user's operation. In this adjustment, the user can adjust the number of image data for use in the composition processing, the exposure difference of the image data, and others, in the effect check of the still image. After the end of the adjustment, the processing returns to step S101. Here, when image data need to be again acquired due to the adjustment, for example, when the number of image data for use in the composition processing is more than an initial value and when there is a change in the exposure difference of the image data, image data are again acquired in step S101, and the display in step S102 is updated.

In step S105, the controller 118 judges whether or not the image data for use in the composition processing has been selected by the user. For example, when the display shown in FIG. 5A is performed, the user can select the image data for use in the composition processing by touching the reduced images 401, 402, and 403. In step S105, when the number of image data necessary for the composition processing are selected by the user, it is judged that the image data for use in the composition processing have been selected by the user. When it is judged in step S105 that the image data for use in the composition processing have been selected by the user, the processing proceeds to step S106. When it is judged in step S105 that the image data for use in the composition processing have not been selected by the user, the processing proceeds to step S107.

In step S106, the controller 118 judges whether or not to make an effect check. For example, when the effect check icon 405 is selected by the user, it is judged that the effect check will be made. When it is judged in step S106 that the effect check will not be made, the processing proceeds to step S107. When it is judged in step S106 that the effect check will be made, the processing proceeds to step S108.

In step S107, the controller 118 judges whether or not a return instruction is issued by the user. For example, when the return icon 406 is selected by the user, it is judged that the return instruction is issued. When it is judged in step S107 that the return instruction is not issued by the user, the processing returns to step S101. When it is judged in step S107 that the return instruction is issued by the user, the processing in FIG. 4 ends.

In step S108, the controller 118 causes the second image processor 106b of the image processor 106 to perform the second composition processing. In response to this instruction, the second image processor 106b composes the image data selected by the user to generate condition-changed still image data.

Figure 5B:
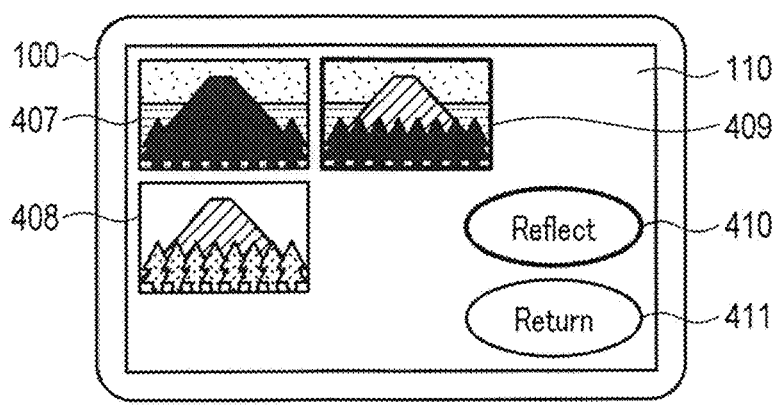
FIG. 5B is a diagram showing an example of comparison display.

In step S109, the controller 118 controls the playback unit 108 to perform comparison display. In response to this instruction, the playback unit 108 displays, on the display 110, a list of reduced images 407 and 408 of the image data used in the composition processing and a reduced image 409 of the image data obtained as a result of the composition processing, for example, as shown in FIG. 5B. Further, the playback unit 108 displays, for example, a reflection icon 410, and a return icon 411. Then the processing proceeds to step S110. Here, the reflection icon 410 is an icon for the user to instruct to reflect the result of the composition processing at the time of the following photography. The return icon 411 is an icon for the user to instruct to return to the screen in FIG. 5A.

For example, in the HDR composition processing, image data having a wide dynamic range can be acquired by the composition of image data different in exposure conditions. Depending on how the image data are selected and how the composition ratio is set here, the finish of composed image data varies.

Figure 6:
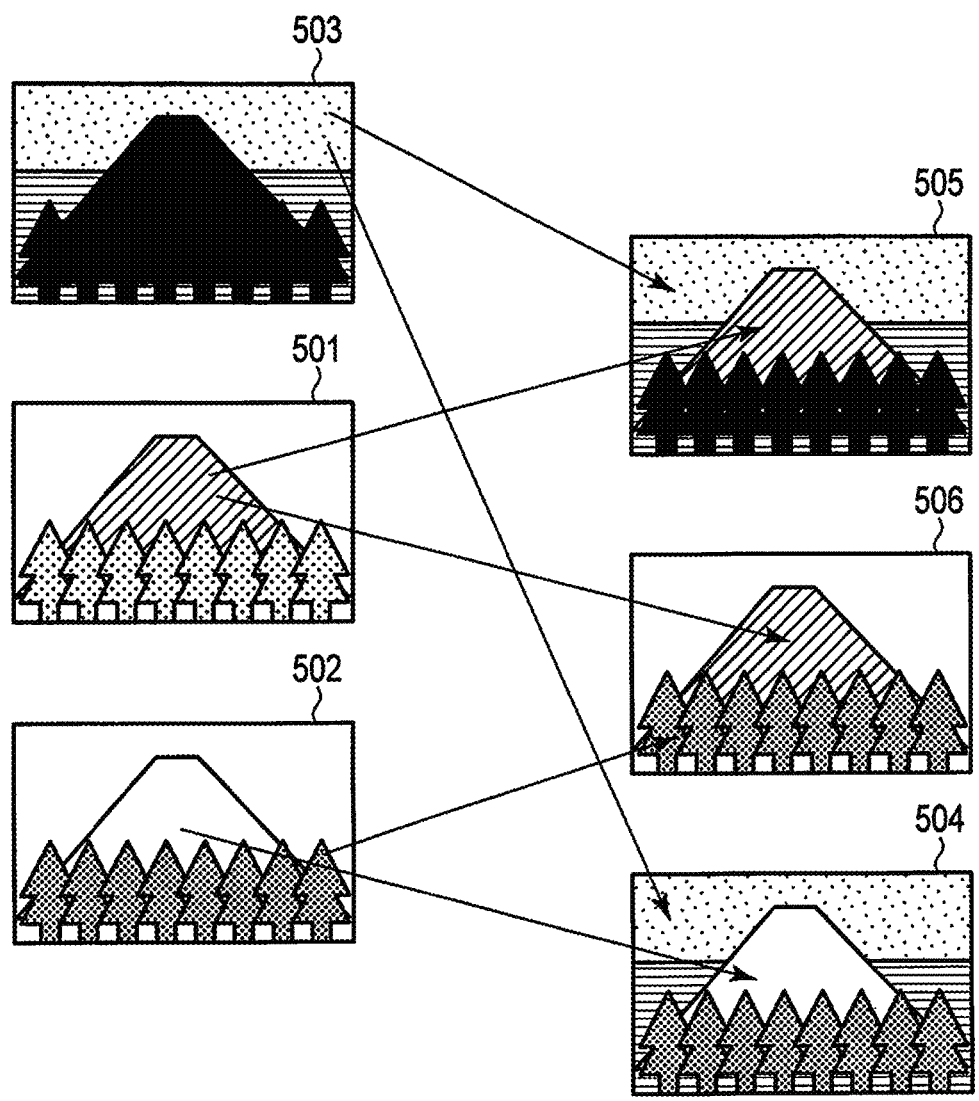
FIG. 6 is a diagram showing an example of composition processing.

The composition of two of image data 501 of normal exposure, image data 502 of overexposure, and image data 503 of underexposure shown in FIG. 6 is shown by way of example. For example, in the HDR composition processing using the image data 502 of overexposure and the image data 503 of underexposure, the second image processor 106b performs composition processing so that a higher composition ratio of the image data 503 of underexposure is set for a saturated sky part of the image data 502 of overexposure and so that a higher composition ratio of the image data 502 of overexposure is set for a tree part of blocked up shadows in the image data 503 of underexposure. As a result of such composition processing, HDR still image data 504 having a dynamic range extended to a high-luminance side and a low-luminance side is generated. In the HDR still image data 504, colors of both the sky part which is a high-luminance part and the tree part which is a low-luminance part can be reproduced at the same time. However, color reproduction of a mountain part which is a medium gradation luminance part is different from color reproduction of a mountain part in the image data of normal exposure.

In the HDR composition processing using the image data 501 of normal exposure and the image data 503 of underexposure, the second image processor 106b performs composition processing so that a higher composition ratio of the image data 501 of normal exposure is set for the mountain part and tree part of blocked up shadows in the image data 503 of underexposure and so that a higher composition ratio of the image data 503 of underexposure is set for the sky part of blown out highlights in the image data 501 of normal exposure. As a result of such composition processing, HDR still image data 505 having a dynamic range extended to the high-luminance side is generated. In the HDR still image data 505, colors of the sky part which is a high-luminance part and relatively bright parts such as the mountain part which is a medium luminance part can be reproduced. However, the tree part which is the low-luminance part has blocked up shadows.

In the HDR composition processing using the image data 501 of normal exposure and the image data 502 of overexposure, the second image processor 106b performs composition processing so that a higher composition ratio of the image data 502 of overexposure is set for the tree part of blocked up shadows in the image data 501 of normal exposure and so that a higher composition ratio of the image data 501 of normal exposure is set for the mountain part of blown out highlights in the image data 502 of overexposure. As a result of such composition processing, HDR still image data 506 having a dynamic range extended to the low-luminance side is generated. In the HDR still image data 506, colors of the tree part which is the low-luminance part and relatively dark parts such as the mountain part which is the medium luminance part can be reproduced. However, the sky part which is the high-luminance part has blown out highlights.

As above, in the composition processing, the finish of the composed image data varies depending on how the image data are selected. Moreover, the finish of the composed image data also varies by the change of the composition ratio. When the comparison display in FIG. 5B is performed in the effect check, the user can set the composition processing for the condition-changed still image data while comparing the images before and after the composition processing.

Here, the explanation returns to FIG. 4. In step S110, the controller 118 judges whether or not one of the reduced images is selected by the user. When it is judged in step S110 that one of the reduced images is selected by the user, the processing proceeds to step S111. When it is judged in step S110 that one of the reduced images is not selected by the user, the processing proceeds to step S115.

Figure 5C:
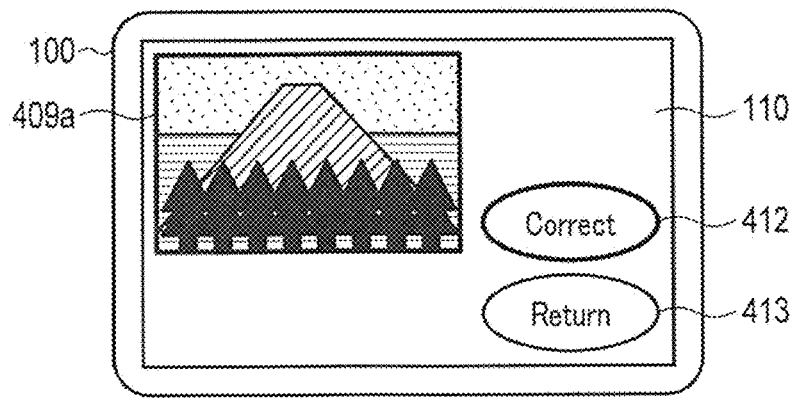
FIG. 5C is a diagram showing an example of enlarged display.

In step S111, the controller 118 instructs the playback unit 108 to perform enlarged display of the selected reduced image. In response to this instruction, the playback unit 108 displays, on the display 110, an enlarged image of the image data corresponding to the selected reduced image, as shown in FIG. 5C. For example, FIG. 5C shows a display example of an enlarged image 409a of the reduced image 409. Further, the playback unit 108 displays, for example, a correction icon 412, and a return icon 413. Then the processing proceeds to step S112. Here, the correction icon 412 is an icon for the user to instruct to correct the result of the composition processing. The return icon 413 is an icon for the user to instruct to return to the screen in FIG. 5B.

In step S112, the controller 118 judges whether or not to make a correction. For example, it is judged that a correction will be made when the user has selected the correction icon 412. When it is judged in step S112 that a correction will not be made, the processing proceeds to step S113. When it is judged in step S112 that a correction will be made, the processing proceeds to step S114.

In step S113, the controller 118 judges whether or not a return instruction is issued by the user. For example, when the return icon 413 is selected by the user, it is judged that the return instruction is issued. When it is judged in step S113 that the return instruction is not issued by the user, the processing returns to step S111. In this case, the enlarged display is continued. When it is judged in step S113 that the return instruction is issued by the user, the processing returns to step S108. In this case, the display returns to the display in FIG. 5B. When the correction described in step S114 is made before the return icon 413 is selected, the contents of the correction are also reflected in the display in FIG. 5B.

In step S114, the controller 118 causes the second image processor 106b to make a correction that conforms to the operation by the user. The correction here includes contrast enhancement, chroma enhancement, and the provision of special effects by the combination of the above for the selected image data, the change of the composition ratio of the image data for use in the composition processing, and others. In the present embodiment, both the correction of each of the image data before composition and the correction of the image data after composition can be made. After the end of the correction, the processing returns to step S111. When the correction is made, composition processing is again performed in step S111, and the display is then updated.

In step S115, the controller 118 judges whether or not to reflect the contents of the correction. For example, when the reflection icon 410 is selected by the user, it is judged that the contents of the correction will be reflected. When it is judged in step S115 that the contents of the correction will not be reflected, the processing proceeds to step S116. When it is judged in step S115 that the contents of the correction will be reflected, the processing proceeds to step S117.

In step S116, the controller 118 judges whether or not a return instruction is issued by the user. For example, when the return icon 411 is selected by the user, it is judged that the return instruction is issued. When it is judged in step S116 that the return instruction is not issued by the user, the processing returns to step S108. When it is judged in step S116 that the return instruction is issued by the user, the processing returns to step S101. In this case, image data are again acquired as needed.

In step S117, the controller 118 stores the contents of the correction in, for example, the storage unit 104. Then the processing in FIG. 4 ends. The contents of the correction stored here will be reflected at the time of the recording of the condition-changed still image.

Here, the explanation returns to FIG. 2A and FIG. 2B. In step S7, the controller 118 judges whether or not the condition-changed recording mode is on. When it is judged in step S7 that the condition-changed recording mode is on, the processing proceeds to step S8. When it is judged in step S7 that the condition-changed recording mode is not on, the processing proceeds to step S16.

In step S8, the controller 118 judges whether or not an instruction to start moving image photography is issued. For example, when the moving image photography icon 306 is selected or the moving image button is operated by the user, it is judged that the instruction to start the moving image photography is issued. When it is judged in step S8 that the instruction to start the moving image photography is issued, the processing proceeds to step S9. When it is judged in step S8 that the instruction to start the moving image photography is not issued, the processing proceeds to step S15.

In step S9, the controller 118 performs the condition-changed moving image photography. That is, the controller 118 performs imaging by the imaging unit 102 while changing the photography conditions so that condition-changed still image data can be generated. Consequently, image data (image frames) different in photography conditions are acquired.

Figure 7A:
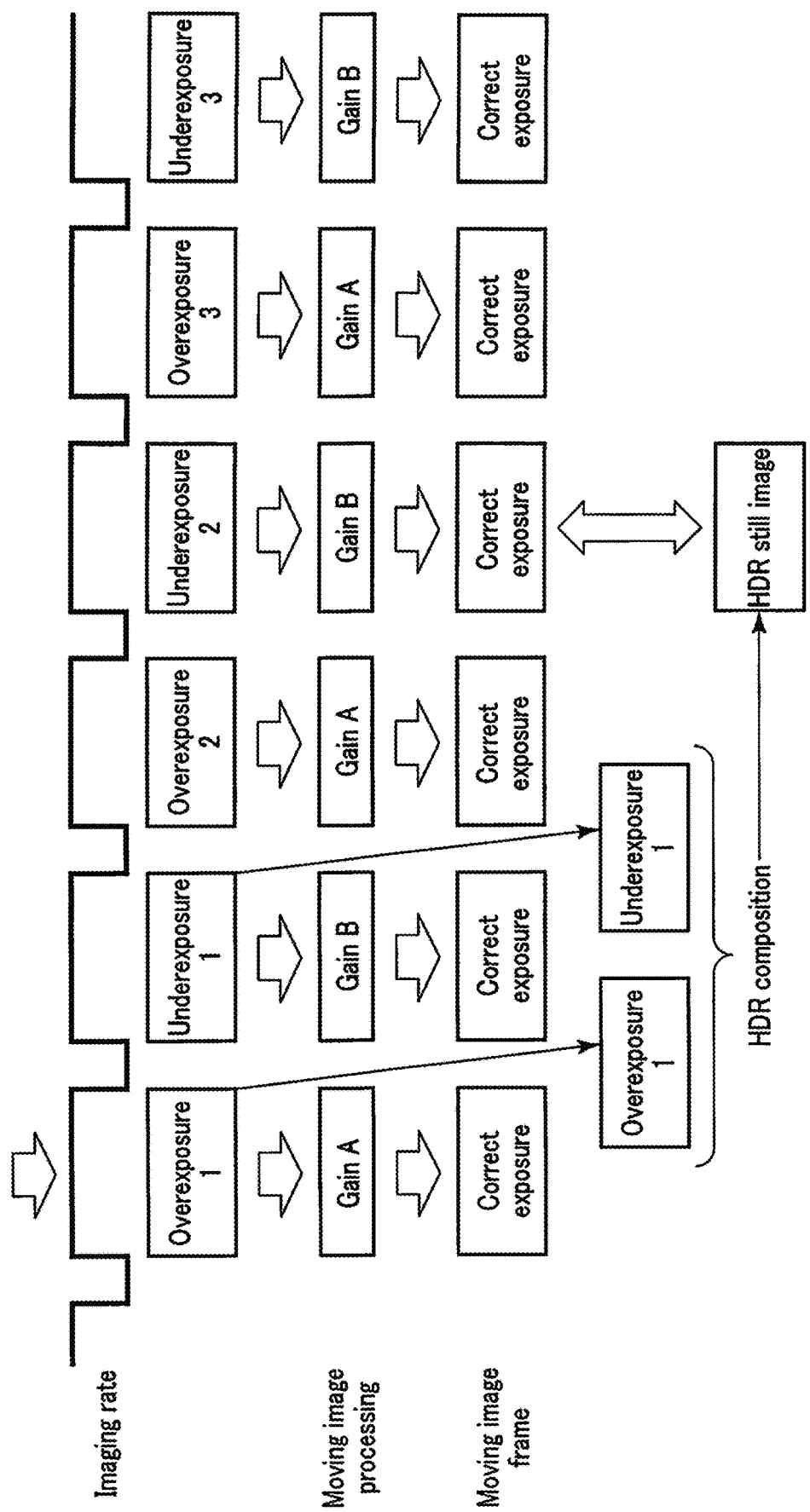
FIG. 7A is a timing chart showing processing of condition-changed moving image photography set to generate an HDR still image.

For example, in the condition-changed moving image photography set to generate an HDR still image as the condition-changed still image, the controller 118 controls the imaging unit 102 so that image data groups comprising pieces of image data different in exposure conditions (e.g. exposure time) will be sequentially generated as shown in FIG. 7A. In the example of FIG. 7A, the controller 118 controls the imaging unit 102 so that overexposure imaging and underexposure imaging will be repeated. An exposure difference in each imaging and others are set in, for example, in the aforementioned effect check.

Figure 7B:
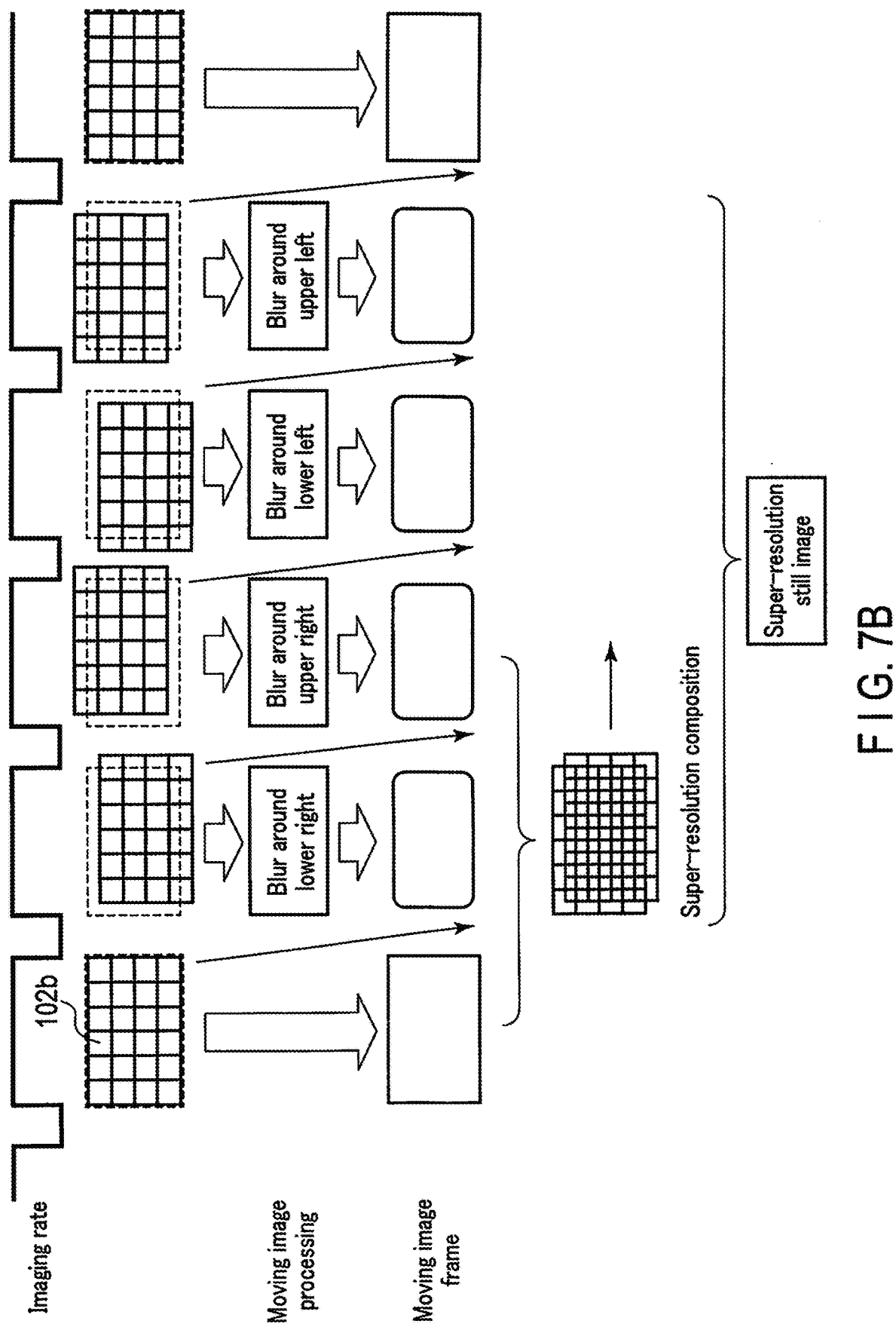
FIG. 7B is a timing chart showing processing of condition-changed moving image photography set to generate a super-resolution still image.

In the condition-changed moving image photography set to generate a super-resolution still image as the condition-changed still image, the controller 118 controls the imaging unit 102 so that an image data group comprising pieces of image data obtained by controlling the drive unit 102c every timing of imaging to shift the imaging element 102b in a slight amount (e.g. an amount of 0.5 pixels) as shown in FIG. 7B will be sequentially generated. In the example of FIG. 7B, the controller 118 controls the drive unit 102c to shift the imaging element 102b downwards to the right, upwards to the right, downwards to the left, and upwards to the left in order.

In step S10, the first image processor 106a corrects the image data to generate moving image frames. As shown in FIG. 7A and FIG. 7B, in the condition-changed moving image photography, the photography condition of each moving image frame is different, so that continuity as moving images is poor. Therefore, in step S10, processing to bring closer the image qualities of the respective moving image frames to maintain continuity as moving images is performed. For example, when it is set to generate an HDR still image as the condition-changed still image, the first image processor 106a makes a gain adjustment to decrease the brightness of overexposure image data and increase the brightness of underexposure image data, as shown in FIG. 7A. When it is set to generate a super-resolution still image as the condition-changed still image, the first image processor 106a performs processing to blur the peripheral part of the image data located in a direction in which the imaging element 102b is shifted at the time of imaging, as shown in FIG. 7B. That is, there is a possibility that the peripheral part of the image data obtained by shifting the imaging element 102b in one direction may not exist in the image data obtained by shifting the imaging element 102b in the other direction. Therefore, such a peripheral part is blurred to reduce strangeness on moving images. Moreover, when it is set to generate a depth-composed still image as the condition-changed still image, the first image processor 106a performs contrast enhancement processing (which may otherwise be edge enhancement processing) varying in magnitude according to focus lens position. That is, because the state of the contrast of the subject changes due to the difference of the position of the focus lens, the state of the contrast of the subject is brought closer to a uniform state by the contrast enhancement processing.

Otherwise, the whole screen of each frame is not shown, but a limited area of a relatively wide image may be only cut out and displayed. For example, when it is set to generate a super-resolution still image as the condition-changed still image, cut-out processing is performed to cut out a limited area of the image data obtained in the imaging unit 102 by the shift direction and shift amount of the imaging element 102b so that the position of the photography target may not change between moving image frames, whereby even if the image is out of position due to, for example, the shift of the imaging element 102b, a corrected display is possible. As above, smoothness of motion is required in moving images, and even if the frames constituting the condition-changed still image are obtained with different characteristics and control, smoothness processing and continuity keeping processing to reduce effects that can be visually recognized in the different processing are performed without difficulty. In this instance, if sound is collected and recorded for the photography target, there is a possibility that acoustic noise at the time of the motion of various mechanisms may be included. Therefore, sound is not recorded as it is either, and condition-changed recording that changes sound collection characteristics (e.g. directivity, gain) and electrically removes noise may be performed.

In step S11, the controller 118 judges whether or not an instruction to end the moving image photography is issued. For example, when the moving image photography icon 306 is again selected or the moving image button is again operated by the user, it is judged that the instruction to end the moving image photography is issued. When it is judged in step S11 that the instruction to end the moving image photography is not issued, the processing proceeds to step S12. When it is judged in step S11 that the instruction to end the moving image photography is issued, the processing proceeds to step S14.

In step S12, the controller 118 judges whether or not to perform still image recording. Whether or not to perform the still image recording is judged by the setting performed in step S6. There are various possible recording timings of the still image during the moving image photography to be set by the user in step S6; for example, only the timing in which an instruction to record the still image is issued by the user, and always (each timing in which still image data can be generated). When it is judged in step S12 that the still image recording will be performed, the processing proceeds to step S13. When it is judged in step S12 that the HDR still image recording will not be performed, the processing returns to step S9.

In step S13, the controller 118 instructs the image processor 106 to generate a still image file. In response to this instruction, the second image processor 106b of the image processor 106 composes the image data stored in the storage unit 104 in accordance with the condition-changed moving image photography to generate condition-changed still image data (e.g. HDR still image data, super-resolution still image data, depth-composed still image data, and panning effect still image data). Then the record processor 106c generates a still image file from the generated condition-changed still image data, and records the generated still image file in the recording unit 112. Then the processing returns to step S9. In the example of FIG. 7A and FIG. 7B, one condition-changed still image data is generated by the composition of the image data obtained by two imagings. The composition number and composition ratio of the image data are set, for example, at the time of the effect check.

In step S14, the controller 118 instructs the image processor 106 to generate a moving image file. In response to this instruction, the record processor 106c of the image processor 106 generates a moving image file from each of the moving image frames stored in the storage unit 104 during the moving image photography, and records the generated moving image file in the recording unit 112. Then the processing returns to step S3.

FIG. 8A is a diagram showing the structure of the moving image file obtained by the condition-changed moving image photography. As shown in FIG. 8A, a moving image file 601 has moving image data 602 and tag information 603.

The moving image data 602 is data comprising compressed moving image frames 602a. As described above, each of the moving image frames 602a has been subjected to processing to maintain continuity as moving images. Details of this processing may be left as information.

The tag information 603 has file information such as a file name of the moving image file 601. The tag information 603 also has associated information 603a including information (e.g. a file name) to identify the condition-changed still image file (e.g. an HDR still image file) to be associated with each of the moving image frames. Having such information makes it possible to search for the corresponding condition-changed still image at the time of moving image viewing and playback, and use the recorded moving image frames to further compose still images.

Figure 8B:
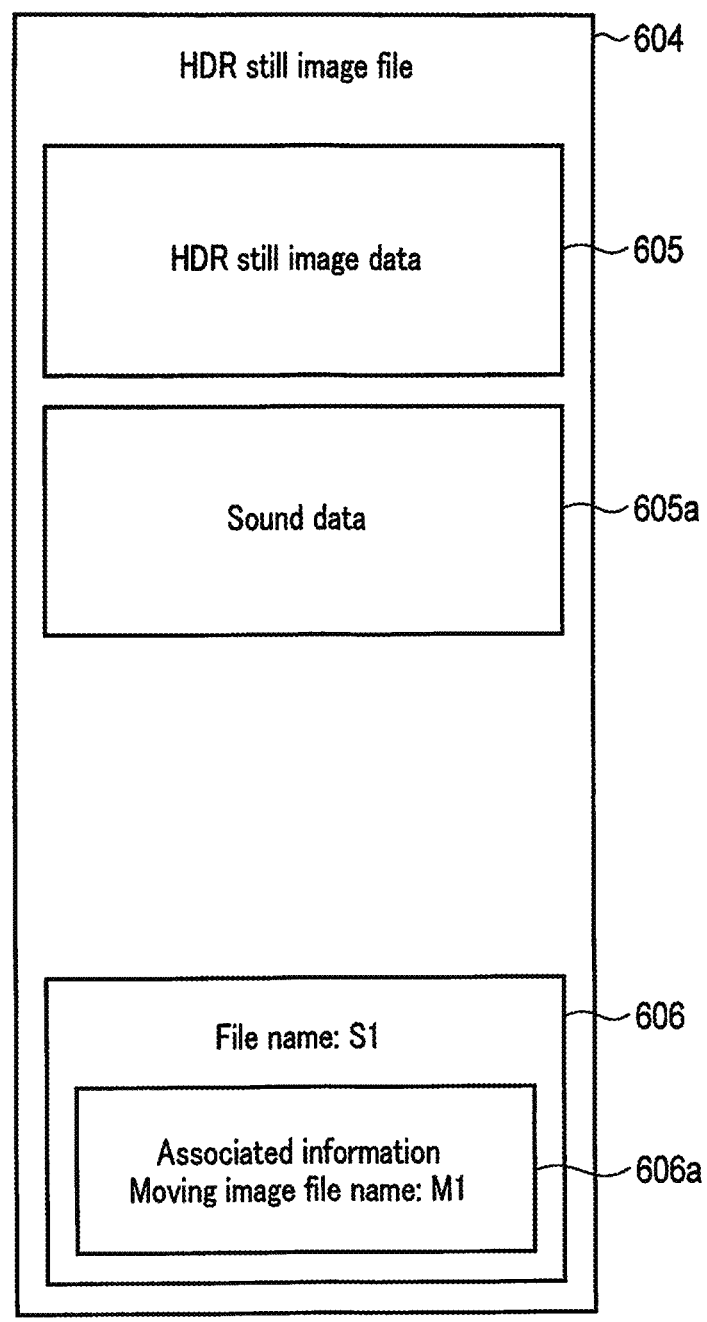
FIG. 8B is a diagram showing the structure of a condition-changed still image file.

FIG. 8B is a diagram showing the structure of the condition-changed still image file (an HDR still image file in the example) obtained by the condition-changed moving image photography. As shown in FIG. 8B, a condition-changed still image file 604 has condition-changed still image data 605 and tag information 606.

The condition-changed still image data 605 is compressed condition-changed HDR still image data (HDR still image data in the example). For use in a television, it is not possible to enjoy without sound, so that, for example, sound data 605a obtained at the time of moving image recording may be contained in the file. As a result, even when this file is played back on a television or the like, it is possible to enjoy image viewing together with sound.

The tag information 606 has file information such as a file name of the condition-changed still image file 604. The tag information 606 also has associated information 606a including information (e.g. a file name) to identify the moving image file to be associated.

Here, in FIG. 8B, the image data used for the generation of the condition-changed still image data may be recorded in the condition-changed still image file 604 in the RAW format. Further, such RAW data may be recorded in a RAW file different from the condition-changed still image file 604. In this case, the RAW file also needs to have information to identify the moving image file and the still image file to be associated with each other. This still image file may have such a degree of freedom as to allow the specifications to be changed in accordance with the monitor to which the file is output, and information in a data format for use in printers as well as monitors may be recorded in the same file together.

In the example shown in FIG. 8A and FIG. 8B, the moving image data and the still image data are recorded in separate files. In contrast, as shown in FIG. 9, the moving image data and the still image data may be recorded in one file. An HDR moving image file 701 in FIG. 9 has moving image data 702, condition-changed still image data (HDR still image data in the example) 703, and tag information 704. Positional information (e.g. a start address of each data, and a data amount from a start address of the file to the start address of each data) of each data to access each data in the file is recorded in associated information 704a of the tag information 704. Although images are only described here, it goes without saying that sound data collected at the time of image recording are also recorded in an associated form in data for televisions (both moving images and still images) so that recorded sound can also be enjoyed at the time of image playback on television.

Here, the explanation returns to FIG. 2A. In step S15 in the case where it is judged in step S8 that the moving image photography will not be performed, the controller 118 judges whether or not an instruction to start still image photography is issued. For example, when the still image photography icon 307 is selected or the release button is operated by the user, it is judged that the instruction to start the still image photography is issued. When it is judged in step S15 that the instruction to start the still image photography is issued, the processing proceeds to step S16. When it is judged in step S15 that the instruction to start the still image photography is not issued, the processing returns to step S3.

In step S16, the controller 118 performs condition-changed still image photography. That is, the controller 118 performs imaging by the imaging unit 102 the number of times of composition while changing photography conditions.

In step S17, the controller 118 instructs the image processor 106 to generate a still image file. In response to this instruction, the second image processor 106b of the image processor 106 composes the image data stored in the storage unit 104 in accordance with the condition-changed moving image photography to generate condition-changed still image data (e.g. HDR still image data, super-resolution still image data, depth-composed still image data, and panning effect still image data). Then the record processor 106c generates a still image file from the generated condition-changed still image data, and records the generated still image file in the recording unit 112. Then the processing returns to step S3.

In step S18, the controller 118 judges whether or not an instruction to start moving image photography is issued. When it is judged in step S18 that the instruction to start the moving image photography is issued, the processing proceeds to step S19. When it is judged in step S18 that the instruction to start the moving image photography is not issued, the processing proceeds to step S22.

In step S19, the controller 118 performs normal moving image photography. That is, the controller 118 performs imaging by the imaging unit 102 without changing photography conditions. In this instance, the controller 118 also collects sound with the microphone 120 and records the sound so that the sound during the image recording can also be enjoyed.

In step S20, the controller 118 judges whether or not an instruction to end the moving image photography is issued. It is judged that the instruction to end the moving image photography is issued. When it is judged in step S20 that the instruction to end the moving image photography is not issued, the processing returns to step S19. When it is judged in step S20 that the instruction to end the moving image photography is issued, the processing proceeds to step S21.

In step S21, the controller 118 instructs the image processor 106 to generate a normal moving image file. In response to this instruction, the record processor 106c of the image processor 106 generates a normal moving image file from the moving image frames stored in the storage unit 104 during the normal moving image photography, and records the generated normal moving image file in the recording unit 112. Then the processing returns to step S3.

In step S22 in the case where it is judged in step S18 that the instruction to start the moving image photography is not issued, the controller 118 judges whether or not an instruction to start still image photography is issued. For example, when the still image photography icon 307 is selected or the release button is operated by the user, it is judged that the instruction to start the still image photography is issued. When it is judged in step S22 that the instruction to start the still image photography is issued, the processing proceeds to step S23. When it is judged in step S22 that the instruction to start the still image photography is not issued, the processing proceeds to step S25.

In step S23, the controller 118 performs normal still image photography. That is, the controller 118 performs imaging once by the imaging unit 102 in accordance with the exposure conditions set in step S6. Then the processing proceeds to step S24.

In step S24, the controller 118 instructs the image processor 106 to generate still image data. In response to this instruction, the second image processor 106b of the image processor 106 generates normal still image data from the image data stored in the storage unit 104 by the normal still image photography. After the generation of the normal still image data, the record processor 106c records the generated normal still image file in the recording unit 112. Then the processing returns to step S3.

In step S25, the controller 118 judges whether or not a return instruction is issued by the user. For example, when the return icon 308 is selected by the user, it is judged that the return instruction is issued. When it is judged in step S25 that the return instruction is not issued by the user, the processing returns to step S3. When it is judged in step S25 that the return instruction is issued by the user, the processing returns to step S1.

In step S26 in the case where it is judged in step S2 that the operation mode is not the photography mode, the controller 118 performs processing other than that of the photography mode. After the other processing, the processing returns to step S1.

Figure 10A:
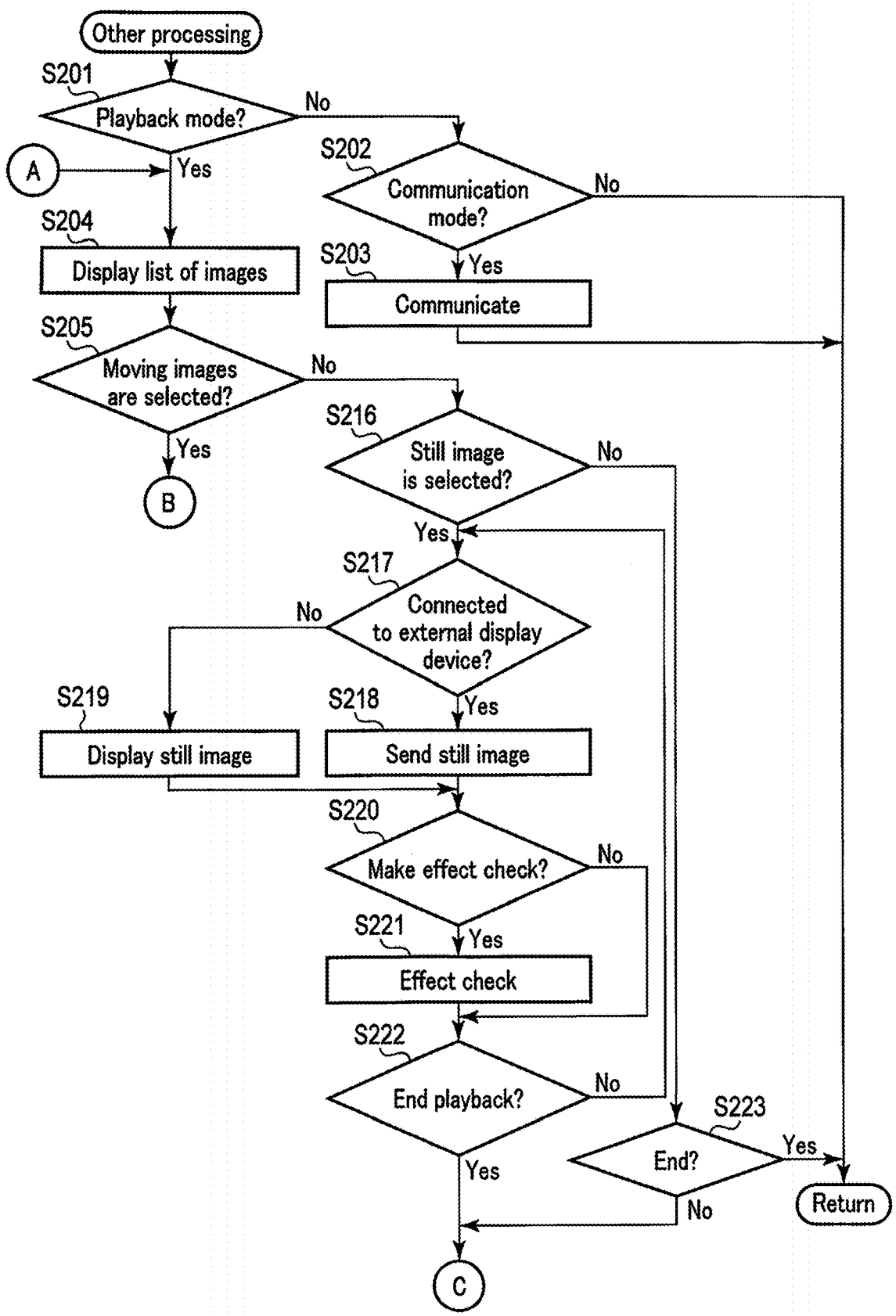
FIG. 10A is a flowchart showing other processing.
Figure 10B:
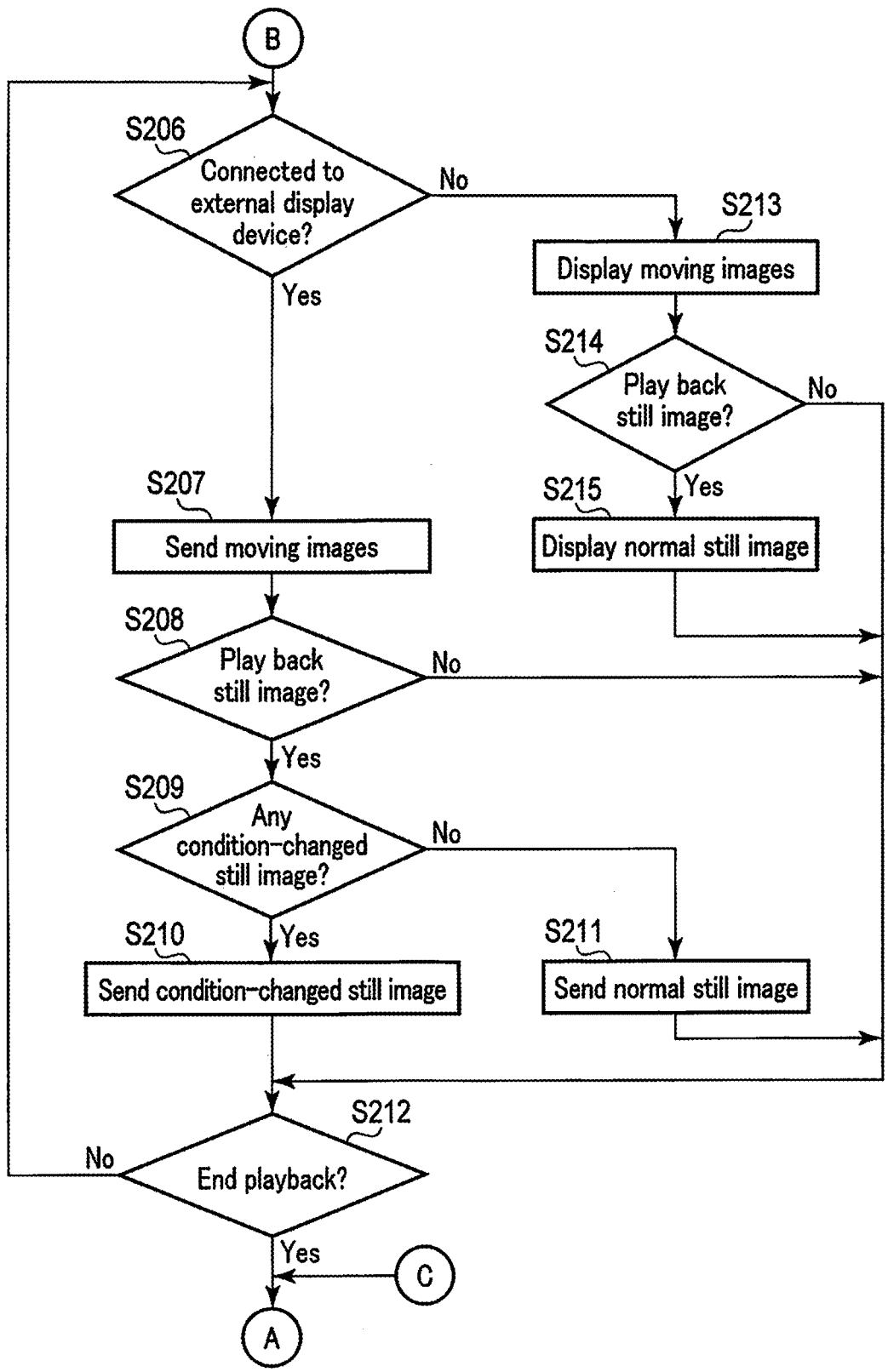
FIG. 10B is a flowchart showing the other processing.

FIG. 10A and FIG. 10B are flowcharts showing the other processing. In step S201, the controller 118 judges whether or not the current operation mode is the playback mode. When it is judged in step S201 that the operation mode of the imaging apparatus 100 is not the playback mode, the processing proceeds to step S202. When it is judged in step S201 that the operation mode of the imaging apparatus 100 is the playback mode, the processing proceeds to step S204.

In step S202, the controller 118 judges whether or not the current operation mode is the communication mode. When it is judged in step S202 that the operation mode of the imaging apparatus 100 is the communication mode, the processing proceeds to step S203. When it is judged in step S202 that the operation mode of the imaging apparatus 100 is not the communication mode, the processing in FIG. 10A and FIG. 10B ends. In this case, the processing returns to step S1 in FIG. 2A.

In step S203, the controller 118 performs the processing of the communication mode. In the processing of the communication mode, the controller 118 controls the communication unit 114 to perform such processing as to send the image file recorded in the recording unit 112 to an external device or receive the image file recorded in the external device. After the processing of the communication mode, the processing in FIG. 10A and FIG. 10B ends. In this case, the processing returns to step S1 in FIG. 2A.

In step S204, the controller 118 controls the playback unit 108 to display a list of the image files recorded in the recording unit 112. In response to this instruction, the playback unit 108 displays, on the display 110, for example, thumbnail images showing the list of the image files recorded in the recording unit 112. Then the processing proceeds to step S205.

In step S205, the controller 118 judges whether or not a moving image file is selected from the displayed list by the user. When it is judged in step S205 that a moving image file is selected by the user, the processing proceeds to step S206. When it is judged in step S205 that a moving image file is not selected by the user, the processing proceeds to step S216.

In step S206, the controller 118 judges whether or not the imaging apparatus 100 is connected to an external display device (e.g. the television 200). When it is judged in step S206 that the imaging apparatus 100 is connected to the external display device, the processing proceeds to step S207. When it is judged in step S206 that the imaging apparatus 100 is not connected to the external display device, the processing proceeds to step S213.

Figure 11:
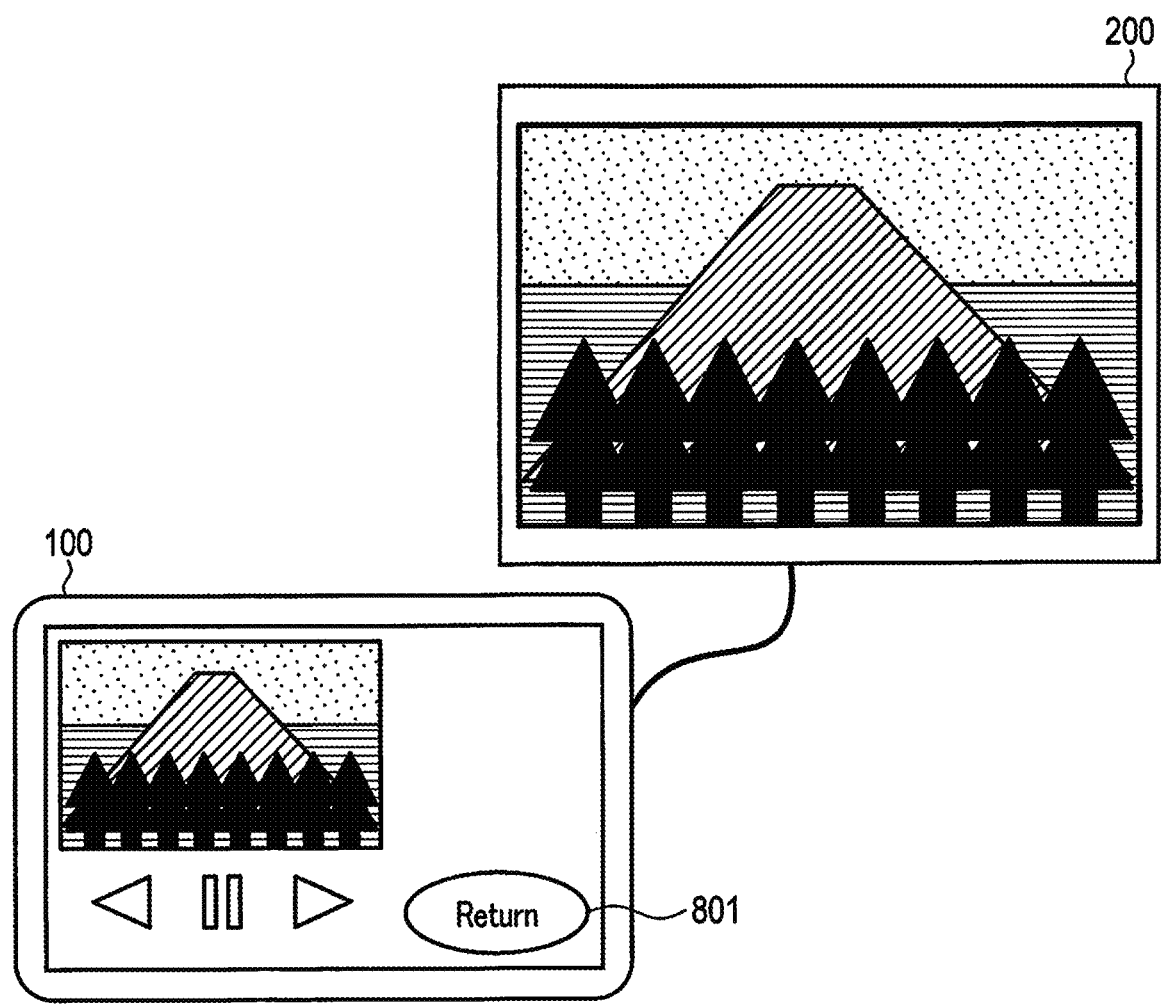
FIG. 11 is a diagram showing an example of playback of an image in an external display device.

In step S207, the controller 118 instructs the playback unit 108 to send the moving image frames corresponding to the selected moving image file to the external display device. Accordingly, the first playback processor 108a of the playback unit 108 sends the moving image frames to the television 200 which is the external display device via the communication unit 114. Consequently, in the television 200 which is the external display device, for example, moving images are played back as shown in FIG. 11. In this instance, the images are output while being played back, so that the playback processors have a function to suitably play back the file which has been recorded with special elaboration as shown in FIG. 8A, FIG. 8B, FIG. 9, and others. For example, sound and images are sent to the television if the television is connected by a system such as HDMI.

In step S208, the controller 118 judges whether or not it is the timing of playing back a still image. For example, when there is still image data (condition-changed still image data or normal still image data) associated with the moving image frames being played back, it is judged that it is the timing of playing back the still image. When it is judged in step S208 that it is the timing of playing back the still image, the processing proceeds to step S209. When it is judged in step S208 that it is not the timing of playing back the still image, the processing proceeds to step S212.

In step S209, the controller 118 judges whether or not the condition-changed still image data is associated with the moving image frames being played back. When it is judged in step S209 that the condition-changed still image data is associated with the moving image frames being played back, the processing proceeds to step S210. When it is judged in step S209 that the condition-changed still image data is not associated with the moving image frames being played back, the processing proceeds to step S211.

In step S210, the controller 118 instructs the playback unit 108 to send the condition-changed still image data associated with the moving image frames being played back to the external display device. Accordingly, the second playback processor 108b of the playback unit 108 sends the condition-changed still image data to the television 200 which is the external display device via the communication unit 114. Consequently, in the television 200 which is the external display device, a condition-changed still image is played back. The condition-changed still image may be played back after the end of the playback of the moving image frames, or may be reduced in size and then played back over the moving image frames being played back.

In step S211, the controller 118 instructs the playback unit 108 to send the normal still image data associated with the moving image frames being played back to the external display device. Accordingly, the second playback processor 108b of the playback unit 108 sends the normal still image data to the television 200 which is the external display device via the communication unit 114. Consequently, in the television 200 which is the external display device, a normal still image is played back. The normal still image may be played back after the end of the playback of the moving image frames, or may be reduced in size and then played back over the moving image frames being played back.

In step S212, the controller 118 judges whether or not an instruction to end the playback of the moving images is issued. For example, when a return icon 801 shown in FIG. 11 is selected, it is judged that the instruction to end the playback of the moving images is issued. When it is judged in step S212 that the instruction to end the playback of the moving images is not issued, the processing returns to step S206. When it is judged in step S212 that the instruction to end the playback of the moving images is issued, the processing returns to step S204.

In step S213 in the case where it is judged in step S206 that the imaging apparatus 100 is not connected to the external display device, the controller 118 instructs the playback unit 108 to display the moving image frames corresponding to the selected moving image file on the display 110. Accordingly, the first playback processor 108a of the playback unit 108 displays the moving image frames on the display 110.

In step S214, the controller 118 judges whether or not it is the timing of playing back a still image. For example, when there is still image data associated with the moving image frames being played back, it is judged that it is the timing of playing back the still image. When it is judged in step S214 that it is the timing of playing back the still image, the processing proceeds to step S215. When it is judged in step S214 that it is not the timing of playing back the still image, the processing proceeds to step S212.

In step S215, the controller 118 instructs the playback unit 108 to display, on the display 110, a still image associated with the moving image frames being played back. Accordingly, the second playback processor 108b of the playback unit 108 displays the still image on the display 110. Consequently, the still image is played back on the display 110.

In step S216 in the case where it is judged in step S205 that a moving image file is not selected by the user, the controller 118 judges whether or not a still image file is selected from the displayed list by the user. When it is judged in step S216 that a still image file is selected by the user, the processing proceeds to step S217. When it is judged in step S216 that a still image file is not selected by the user, the processing proceeds to step S223.

In step S217, the controller 118 judges whether or not the imaging apparatus 100 is connected to an external display device (e.g. the television 200). When it is judged in step S217 that the imaging apparatus 100 is connected to the external display device, the processing proceeds to step S218. When it is judged in step S217 that the imaging apparatus 100 is not connected to the external display device, the processing proceeds to step S219.

In step S218, the controller 118 instructs the playback unit 108 to send, to the external display device, the still image data (condition-changed still image data or normal still image data) included in the selected still image file. Accordingly, the second playback processor 108b of the playback unit 108 sends the still image data to the television 200 which is the external display device via the communication unit 114. Consequently, in the television 200 which is the external display device, a still image is played back.

In step S219, the controller 118 instructs the playback unit 108 to play back, on the display 110, the still image data (condition-changed still image data or normal still image data) included in the selected still image file. Accordingly, the second playback processor 108b of the playback unit 108 displays the still image on the display 110.

In step S220, the controller 118 judges whether or not to make an effect check. For example, when the HDR effect check icon displayed on the display 110 during the playback of the still image is selected, it is judged that the effect check will be made. When it is judged in step S220 that the effect check will be made, the processing proceeds to step S221. When it is judged in step S220 that the effect check will not be made, the processing proceeds to step S222.

In step S221, the controller 118 performs the processing of the effect check. The processing of the effect check is substantially the same as the processing in FIG. 4 described above. In the effect check in the photography mode, image data for the effect check is acquired by imaging. In contrast, in the effect check in the playback mode, image data for the effect check can be acquired in any manner. After the end of the effect check, the processing proceeds to step S222.

In step S222, the controller 118 judges whether or not an instruction to end the playback of the still image is issued. When it is judged in step S222 that the instruction to end the playback of the still image is not issued, the processing returns to step S217. When it is judged in step S222 that the instruction to end the playback of the still image is issued, the processing returns to step S204.

In step S223, the controller 118 judges whether or not to end the processing in the playback mode. For example, when a return instruction is issued by the user during the display of the list, it is judged that the processing in the playback mode will be ended. When it is judged in step S223 that the processing in the playback mode will not be ended, the processing returns to step S204. When it is judged in step S223 that the processing in the playback mode will not be ended, the processing in FIG. 10A and FIG. 10B ends. In this case, the processing returns to step S1 in FIG. 2A.

As described above, in the present embodiment, it is possible to generate a condition-changed still image which is generated by the composition of image data different in photography conditions, by performing imaging while changing the photography conditions during moving image photography. Consequently, moving images can be more attractive contents.

Furthermore, in the present embodiment, moving image frames are generated after image data obtained by multiple imaging different in photography conditions is subjected to processing that maintains continuity of moving images. This makes it possible to perform both display suited to the specifications of the display 110 of the imaging apparatus and display suited to the specifications of the television 200.

While the present invention has been described above on the basis of the embodiment, the present invention is not limited to the embodiment described above, and it should be understood that various modifications and applications can be made within the scope of the spirit of the present invention. In the technique according to the present embodiment, the condition-changed moving image photography can be replaced with through-image display. In this case, various still images such as an HDR still image, a super-resolution still image, and a depth-composed still image can be displayed by the timing specified by the user during the through-image display. Such processing is applicable to imaging apparatuses such as an endoscope device, a microscope device, and a monitoring device.

Each process according to the embodiment described above can also be stored as a program executable by the controller 118 which is a computer. Otherwise, each process according to the embodiment described above can be stored and distributed in a recording medium of an external storage device such as a magnetic disk, an optical disk, or a semiconductor memory. The controller 118 then reads the program stored in the recording medium of the external storage device, and the operation of the controller 118 is controlled by the read program, whereby the controller 118 can execute the processes described above. As applicability, whether or not the result of display is satisfactory can be input by manual operation, biological determination, or the like so that the user's taste will be learned accordingly. That is, control that cooperates with artificial intelligence may be used. In this case, similar advantageous effects can be obtained even without a step-by-step program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging unit which sequentially acquires image frames whose photography conditions have been changed;
   a first image processor which generates moving image data by performing image processing to maintain continuity between the image frames obtained by changing the photography conditions, during recording of a moving image;
   a second image processor which composes the image frames whose photography conditions have been changed, to generate condition-changed still image data; and
   a record processor configured to record the moving image data and the condition-changed still image data in a single file so that the moving image data and the condition-changed still image data are associated with each other.

2. An imaging apparatus comprising:
   an imaging unit which sequentially acquires image data groups comprising pieces of image data different in photography conditions;
   a first image processor which generates moving image data comprising moving image frames formed by each of the pieces of the image data;
   a second image processor which composes pieces of image data belonging to each of the image data groups or pieces of image data that do not belong to the image data groups, to generate condition-changed still image data; and
   a record processor configured to record the moving image data and the condition-changed still image data in a single file so that the moving image data and the condition-changed still image data are associated with each other,
   wherein the first image processor generates moving image frames after subjecting each of the pieces of the image data to image processing which maintains continuity between the image frames during recording of a moving image.

3. The imaging apparatus according to claim 2, wherein the photography conditions are an exposure difference between the pieces of the image data, and
   the image processing which maintains continuity is a gain adjustment to bring exposure amounts of the pieces of the image data to a uniform exposure amount.

4. The imaging apparatus according to claim 2, wherein the photography conditions are a shift direction of an imaging element included in the imaging unit, and
   the image processing which maintains continuity is blurring processing for a peripheral portion of the piece of the image data positioned in the shift direction of the imaging element, or cut-out processing to cut out the piece of the image data in accordance with the shift direction of the imaging element so that the position of a target of photography does not change.

5. An imaging method comprising:

sequentially acquiring, by an imaging unit, image frames whose photography conditions have been changed;

generating moving image data by performing image processing to maintain continuity between the image frames obtained, during recording of a moving image, by changing the photography conditions;

composing the image frames whose photography conditions have been changed, to generate condition-changed still image data; and recording the moving image data and the condition-changed still image data in a single file so that the moving image data and the condition-changed still image data are associated with each other.

6. An imaging method comprising:

sequentially acquiring, by an imaging unit, image data groups comprising pieces of image data different in photography conditions;

generating moving image data comprising moving image frames formed by each of the pieces of the image data after subjecting each of the pieces of the image data to image processing which maintains continuity between the image frames obtained during recording of a moving image;

composing image data belonging to each of the image data groups or image data that do not belong to the image data groups, to generate condition-changed still image data; and recording the moving image data and the condition-changed still image data in a single file so that the moving image data and the condition-changed still image data are associated with each other, wherein the first image processor generates moving image frames after subjecting each of the pieces of the image data to image processing which maintains continuity between the image frames during recording of a moving image.

7. The imaging apparatus of claim 1 wherein the photography conditions of the image frames sequentially acquired are changed cyclically, and wherein the image processing performed to maintain continuity between the image frames obtained removes or reduces the effect of the cyclically changed photography conditions thereby generating a moving image file with improved continuity.

8. The imaging method of claim 5 wherein the photography conditions of the image frames sequentially acquired are changed cyclically, and wherein the image processing performed to maintain continuity between the image frames obtained removes or reduces the effect of the cyclically changed photography conditions thereby generating a moving image file with improved continuity.

* * * * *